United States Patent Office 3,507,362
Patented Apr. 21, 1970

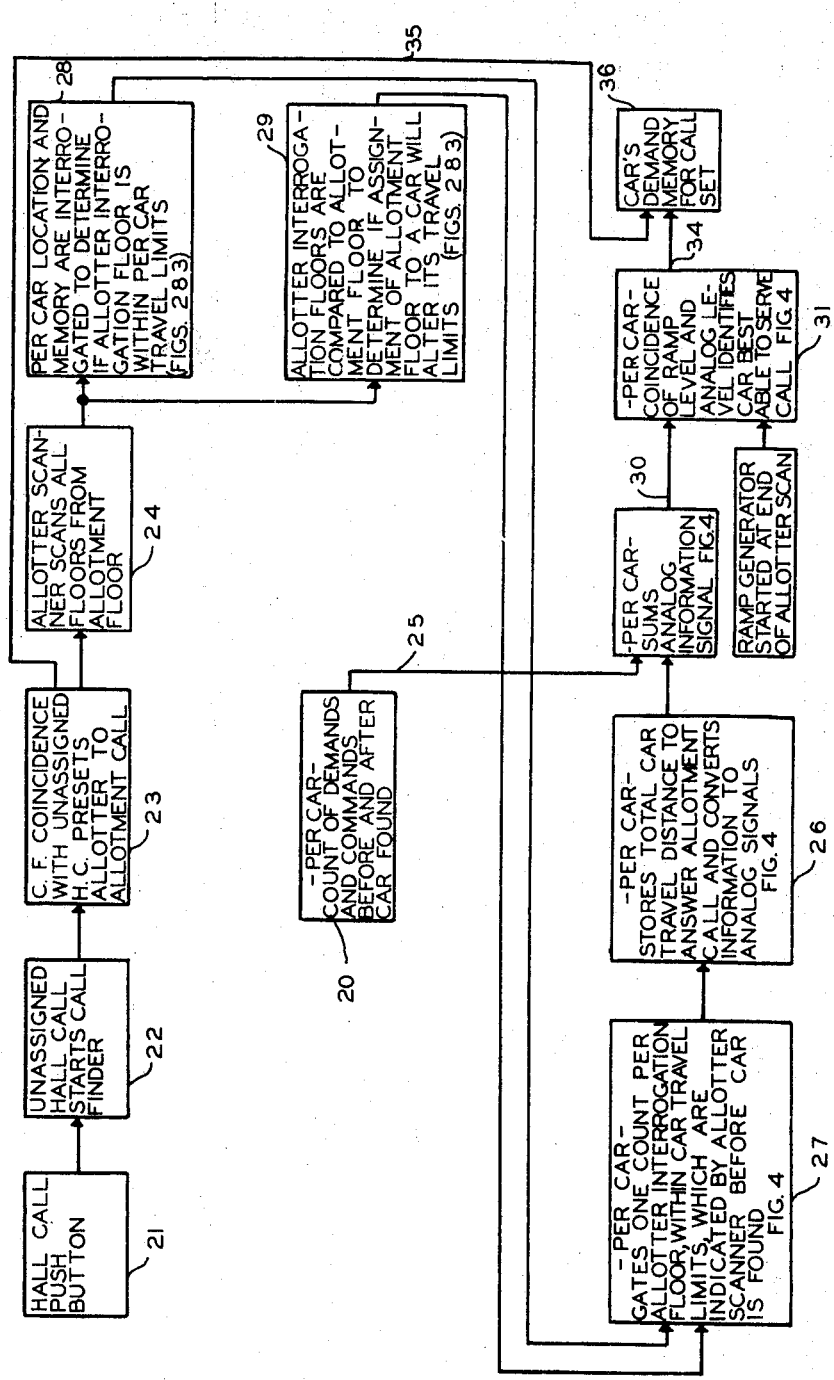

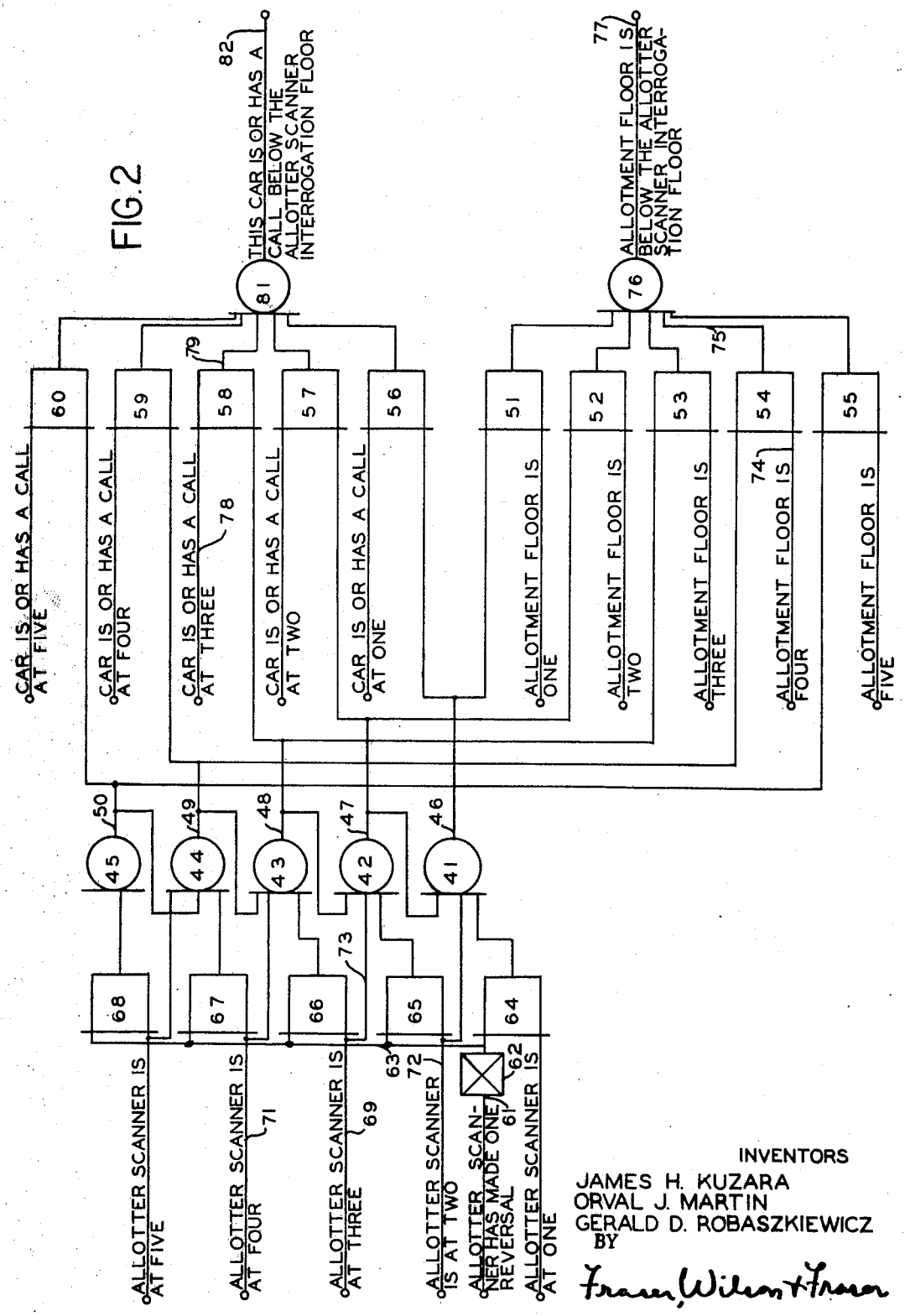

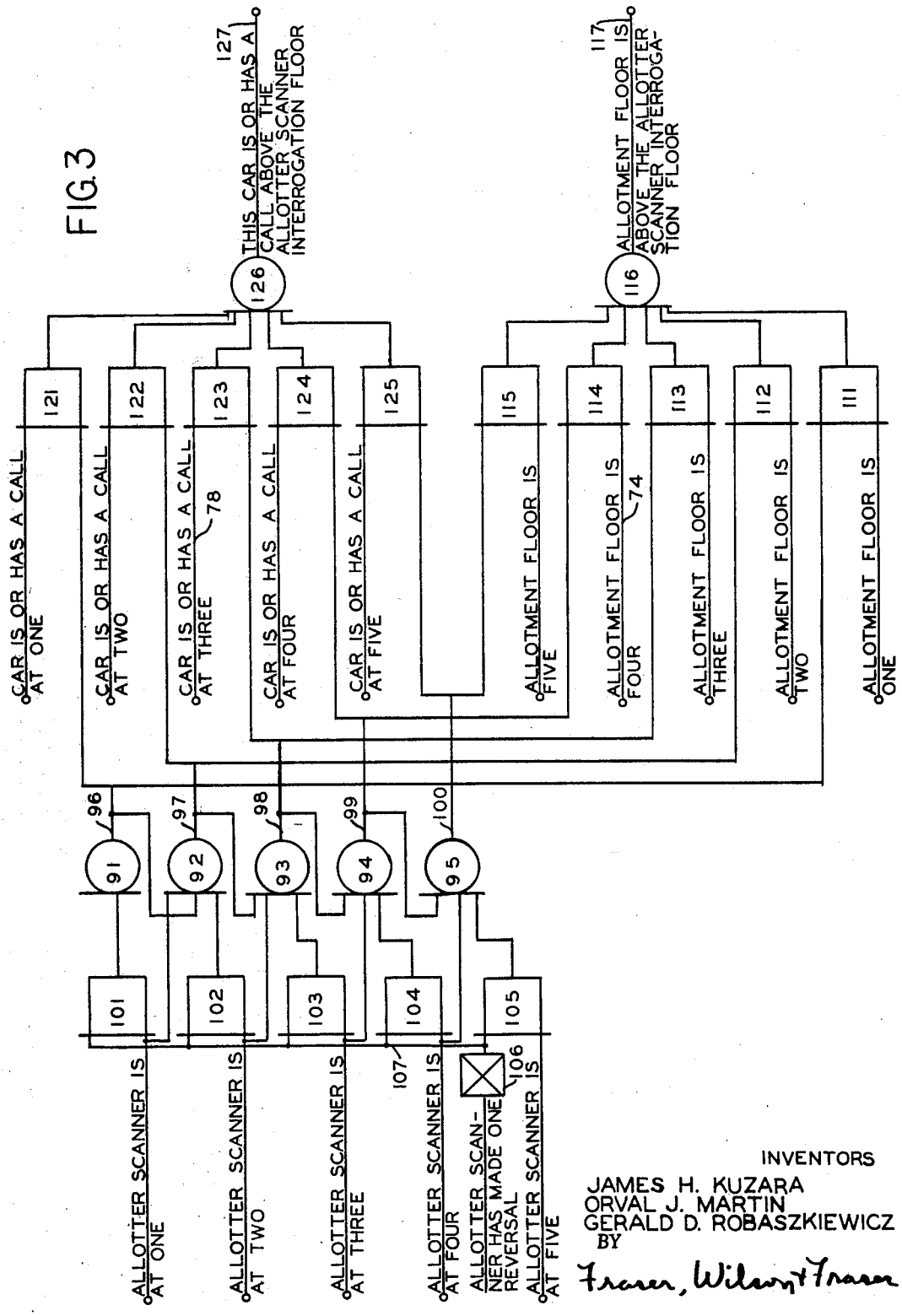

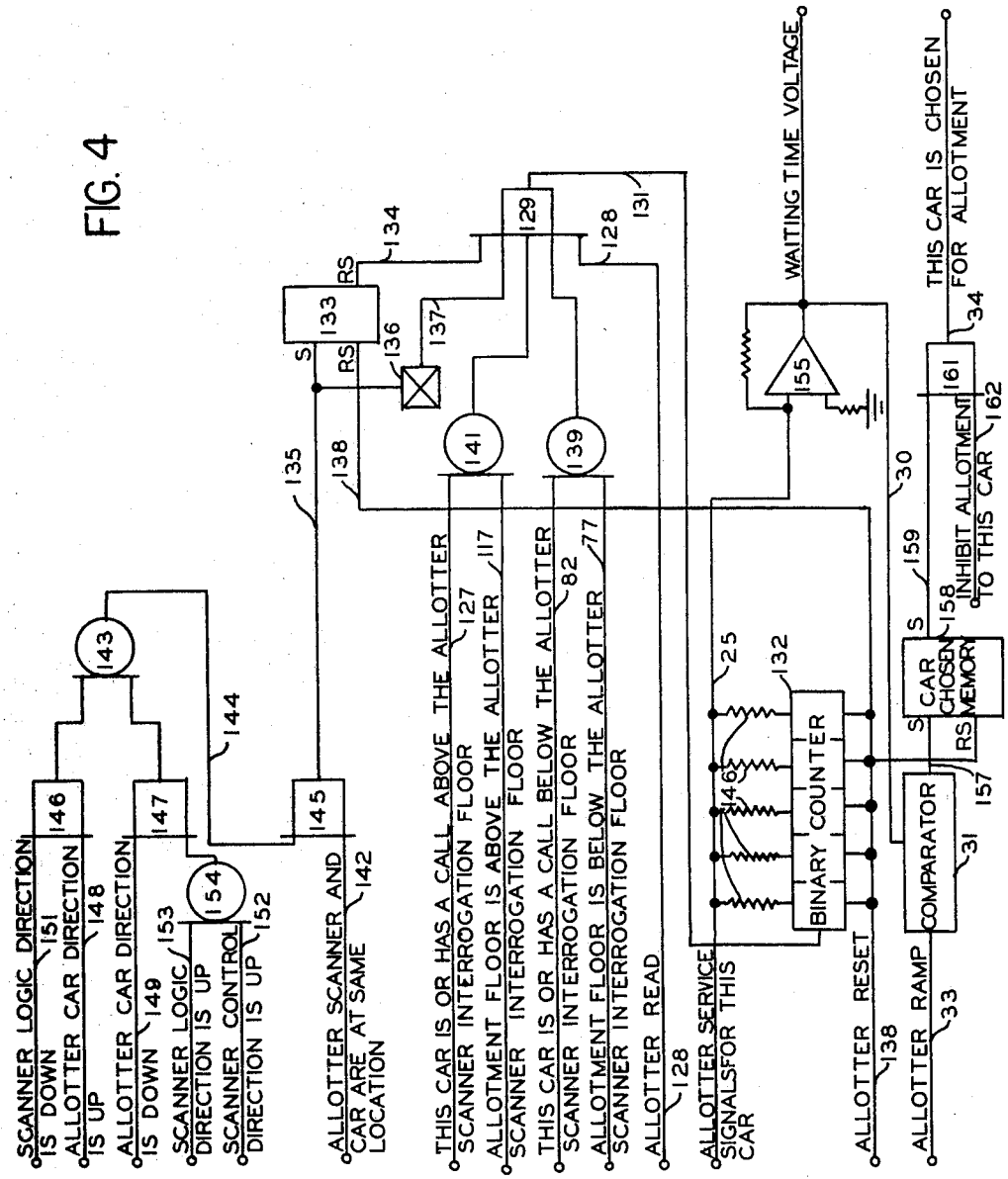

3,507,362
APPARATUS FOR MEASURING ELEVATOR CAR TRAVEL
James H. Kuzara, Sylvania, and Orval J. Martin and Gerald D. Robaszkiewicz, Toledo, Ohio, assignors to Reliance Electric and Engineering Company, Inc., Cleveland, Ohio, a corporation of Ohio
Filed Jan. 20, 1967, Ser. No. 610,581
Int. Cl. B66b 1/34
U.S. Cl. 187—29      15 Claims

ABSTRACT OF THE DISCLOSURE

An apparatus for measuring the distance an elevator car is required to travel to serve a call. Distance is scanned between the floor of the call and the car along the path which the car will travel. A gate admits scanned floor counts to a distance counter only for those floors within the range of travel required of the car as defined by the calls then assigned to the car, the current location of the car and the location of the call being evaluated.

---

This invention relates to an improvement in the elevator controls disclosed in United States patent application Ser. No. 493,973, now Patent No. 3,443,668, by Donivan L. Hall and William C. Susor entitled "Elevator Controls," and the United States patent application Ser. No. 494,194 by Donivan L. Hall, William C. Susor and James H. Kuzara entitled "Elevator Controls," both of which were filed Oct. 8, 1965 and is particularly concerned with optimizing the assignment developed between a call and a car in order to improve elevator service.

In the aforenoted patent applications, a system is disclosed which is particularly applicable to a plural car elevator system wherein the registered hall calls are assigned to individual cars on the basis of the capability of the cars to serve those calls. In application Ser. No. 494,194 the assignment is accomplished by individually processing each call through an allotment procedure which evaluates the capability of each car to serve that call and develop an assignment between the call and car such that the car having the greatest capability to serve the call receives the call assignment. The evaluation as to the car's capability to serve is made by means of an allotter including a scanning device which scans the entire range of travel of the elevator system beginning from the floor of the call and advancing in a direction opposite the service direction of the call to a first limit of travel where it reverses and scans to a second limit of travel and again reverses, returning to the floor of the call. During this scanning operation the distance between each car and the call is counted by individual car distance counters which are gated from the floor of the call until the car is in coincidence with scan position. The evaluation also includes a count of the number of car calls and hall calls which each car is required to serve at the time of the scan and the loading imposed upon the car. All of these factors are translated to analog signal levels on a scale based upon car service time and summed for each car such that the car having the lowest summed signal or sum of service times is assigned the call under consideration.

The evaluation of service capability is changed continuously throughout the operation of a multi-car elevator system. Since the process of evaluation can be accomplished extremely rapidly, an improvement upon the aforementioned system has been developed wherein each car is cleared of assigned hall calls which do not correspond to registered car calls each time a new car call is registered in the car. In this type of system assigned hall calls are termed "demands" and assigned car calls are termed "commands". The reassignment control has been disclosed in a patent application filed in the name of James H. Kuzara entitled "Group Elevator Control Having Call Reset of Advance Hall Call Assignment," United States patent application Ser No. 610,574, now Patent No. 3,450,231. Thus an opportunity is afforded to successively improve upon the optimization of the hall call assignment where each command results in a release of demands assigned to that car.

The present invention further improves the optimization of the aforenoted type of systems by more precisely defining the distance a car will be required to travel if it is assigned to the allotment call, the call subject to assignment and currently under consideration. In the system of Ser. No. 494,194 the distance counter for each car counted every scan step of the allotter scanner between the allotment call and the coincidence of the scan with the floor at which the car is located while traveling or set to travel in a direction opposite the scan direction. When a car traveled in a direction opposite the service direction of the allotment call, the scanner ran to a limit of the system, reversed and scanned from the limit until it encountered the car. Usually a car is not required to travel to the terminal landing in its range of travel and instead reverses at some landing at which its farthest call is registered short of the terminal landing. Thus in previous distance counters landing were counted representing a distance to be traveled by the car which gace a false indication of that travel distance inasmuch as the car would not travel to the terminal. Such superfluous travel becomes extremely significant in high rise buildings where many floors can be included in the distance count which are not to be traversed by the car in the trip under consideration. The present invention avoids this false indication of distance to be traveled by counting only the landing actually to be traversed by the car.

While the present invention could be applied to a single car elevator system, its greatest utility is with respect to a multi-car system wherein the cars each have different limits of travel at any given moment. Under these circumstances, the allotter scanner common to all cars scans the entire range of travel beginning with and ending at the floor which is the allotment floor and a gating circuit individual to each car gates impulses from the scanner to the distance counter individual to each car only for those landings which will be traversed by the car. Each of the lower and upper travel limits for each car is defined by one of four conditions: either the location of the car, a command imposed by a car call within the car, or a demand imposed by the allotment of a hall call to the car or the allotment call. The gating circuit for the distance counter of each car considers all of these factors and inhibits the application of clocking pulses corresponding to the advance steps of the allotter scanner scanning the floors of the building as a scanner passes the outermost limit determining the range of limit of the car. Thus for example, if an up call were registered at the fourth landing and were the allotment call under consideration, the allotter scanner would scan downwardly to the first landing, reverse itself, scan upwardly to the uppermost landing and then reverse itself again to scan downwardly to the fourth landing. Further, if car A were traveling downward to a command for the third floor from the tenth floor, its lowest position during the trip would be floor three and it would be required to traverse floors nine through three, reverse at three and run to four. The scan would be counted for floors four and three, as it descended further no count would be made, upon its ascent no count would be made until the scan reached four. It then would count four through nine for a total count of eight corresponding to the eight floors of travel for car A to complete its service and run to the allotment call.

An object of this invention is to improve elevator controls.

Another object is to optimize the evaluation of the service ability of an elevator car with respect to a call.

A third object is to ascertain the true distance an elevator car will be required to travel to complete its currently assigned service and serve a given floor in a given service direction.

In accordance with the above objects a feature of the invention is a gate for clocking pulses of a scanner to pass those pulses to a distance counter of a car for the number of floors which the car will traverse between its current position and a floor.

Another feature is a circuit for identifying the spatial relationship between the scanner interrogation floor and the allotment floor.

A further feature is a circuit for identifying the spatial relationship between the scanner interrogation floor and the car or its car calls or assigned hall calls whichever is closest to the limits of travel for the system.

The above and additional objects and features will be understood more fully from the following detailed description when read with reference to the accompanying drawings in which:

FIG. 1 is a functional block diagram of the system embodying the distance measuring means of this invention;

FIG. 2 is a logic diagram for five typical floors for ascertaining if the allotment floor is below the allotter scanner interrogation floor and for a typical car for ascertaining if the car is below or has a call below the allotter scanner interrogation floor;

FIG. 3 is a logic diagram for five typical floors for ascertaining if the allotment floor is above the allotter scanner interrogation floor and for a typical car for ascertaining if the car is above or has a call above the allotter scanner interrogation floors; and FIG. 4 is a logic diagram of the distance counter gating, distance counter, analog service capability signal source, comparator, and car chosen memory for a typical car.

The system of the aforenoted Hall et al. patent applications is represented functionally in those portions of FIG. 1 for which no figure numbers have been designated. The disclosures of that system are incorporated herein by reference if deemed necessary. In general the system of the present invention can be considered as applied to a four car system serving thirteen floors. A hall call device for up travel is provided at each of floors one through twelve as an up hall call button and a down hall call button of similar form is provided at each of floors two through thirteen. Each car has a car call device for each floor it serves. Hall calls from button 21 are stored in memories (not shown) and can be assigned directly to a car having a car call for the same floor if that car is set for the same service direction and can also be assigned directly to a car at the floor of the call and set for the proper service direction (all by means not shown). If the hall call is not directly assigned it is identified by a call finder 22, a scanning device which is set in operation if it is not in coincidence with the floor and service direction of the call to run until coincidence is established.

When call finder coincidence with an unassigned hall call occurs, the call finder gating controls 23 identify the floor and service direction of the call as an allotment call. A call allotter is preset to the allotment call by setting an allotter scanner 24 at a scan position corresponding to the allotment floor and setting the initial allotter scan direction in opposition to the service direction of the allotment call. A clocking pulse source (not shown) is then set in operation to issue pulses which advance the allotter scanner interrogation floor in the scan direction and to issue a read pulse following each scan advance pulse whereby the conditions at the interrogation floor are read into the service evaluation means of the cars.

Included among the evaluation means are counters and gating means which develop signals indicative of the number of car calls for each car, termed "commands" in this system, the number of hall calls allotted to each car termed "demands." Other evaluating means are responsive to the state of the cars as to whether they are in a status which would impede their service as disclosed for "taxi service" in the United States patent application Ser. No. 610,576 of Donivan L. Hall, James H. Kuzara and Orval J. Martin entitled "Elevator Control Providing Preferred Service to Hall Calls Registered for a Long Time," for "queue service" as disclosed in the United States patent application Ser. No. 610,523 of Donivan L. Hall, Gerald D. Robaszkiewicz and Orval J. Martin entitled "Queueing Controls for a Group of Elevators," and for $m$-$g$ set shutdown as disclosed in United States patent application Ser. No. 610,575 for "Energizing Controls for Elevator Hoist Equipment of a Plural Car Elevator System" of Donivan L. Hall and Gerald D. Robaszkiewicz, each of which were filed herewith. The loading of the cars is also a factor evaluated as retarding service. These evaluation means are combined as at 20 to develop signals on lead 25 of FIGS. 1 and 4 which can be scaled to service time such that each significant factor imposed on a car increases the service time for that car by an appropriate amount and increases the signal by a corresponding amount.

Added to the service signals for each car noted above is a signal indicative of the distance that car must traverse between its current position and the allotment call at the time of service capability evaluation by the allotter. This distance can also be scaled to service time for each car. It is ascertained as a count of the number of floors the car must travel in a counter 26 as shown in FIG. 4. Pulses of the steps of the allotter scanner as it scans each allotter interrogation floor are passed by gating means 27 which gates one count per allotter interrogation floor for those floors within the car travel limits as defined by the controls 28 which indicate that the car position or a call for the car is beyond the allotter interrogation floor. The assignment of the allotment call to the car can extend its travel limits as ascertained by the controls 29 which indicate that the allotment floor is beyond the allotter interrogation floor.

The summed actual travel distance signal and the other service factor signals are applied through lead 30 to the car's comparator 31. A ramp generator 32 also supplies a signal on lead 33 to each car's comparator 31. The ramp increases with time and causes the car whose signal on lead 30 is at the lowest level to be chosen when a predetermined relationship between that signal and the ramp is sensed by the car's comparator 31. Identification of the chosen car on lead 34 and of the allotment call on lead 35 is applied to the demand memory 36 of the car for the floor and service direction of the hall call being allotted. This smallest signal on lead 30 represents the shortest predicted service time and thus the car which should best be able to serve the call.

The system has been depicted in logic diagram form in FIGS. 2, 3 and 4 wherein signal inputs are labeled functionally and are represented to the logic elements as positive going signals. In practice the logic elements have been made up of semiconductive active elements, primarily diodes and transistors supplied at −12 volts; hence a ground signal constitutes a positive going signal at an input. The logic elements comprise: ORs, typified by element 41 of FIG. 2, which are gated to issue a positive signal on an output lead 46 when a positive signal is applied to any of a multiplicity of input leads 47, 72 or from AND 64; inverters, such as 62, which invert a positive or ground signal on their input lead 61 to a negative signal in their output lead 63 and a negative signal on their input to a positive or ground signal on their output; ANDs, such as 66, which gate a positive signal to their output lead when there is a coincidence of positive signals on all of their input leads 63, and 69; flip flops, such as 133 of FIG. 4 which invert their signal output from negative to positive on their set output lead designated by $s$ and from a positive to a negative on their reset output lead 134 in response to a positive signal on their set input lead 135, shown on the left and designated by $s$, and return to their initial state in response to a positive signal on their reset lead 138, on the left and designated by $rs$; operational amplifiers, such as 155; and comparators such as 31 which sense a given relationship between signal levels imposed on two input leads 30 and 33 and issue a positive signal on their output lead 157 in response thereto. Each of these elements has an established state in the art and therefore is not disclosed in detail herein.

Since the various circuits of FIGS. 2, 3 and 4 are part of a system they have interconnecting leads which are identified both by reference character and, when convenient, functional designation. Interconnected leads have been assigned like reference characters in the several drawings.

The logic diagrams show in FIGS. 2 and 3 bottom and top distance gates for the allotter which issue signals to locate the limits of travel as the allottment floor, if such be the case, by gating means common to the system. They also represent typical gates for each car for locating the limits of travel when the car is at its limit and when the car has a call to which it must travel as a limit. The distance counter for a typical car is shown in FIG. 4. It receives pulses corresponding to steps of the allotter scanner as it interrogates the floors for travel limits so long as the interrogation is within those limits for the car as defined for the bottom limit by one of the circuits of FIG. 2 and for the top limit by one of the circuits of FIG. 3 and so long as the car has not been found by the scanner interrogation as defined in the car locating gate in the upper portion of FIG. 4. When the limits for a car are exceeded by the scanner or the car is found by the scanner no further distance count is accumulated for that car. The final distance count is summed as an analog signal with other analog service signals for the car and applied to a comparator for the car by the equipment in the lower portion of FIG. 4.

In FIG. 2 the scanner bottom distance gate signal for all cars of the system is derived from floors 1 to 5 from the ORs 41 to 45 respectively on leads 46 to 50 respectively. These signals are applied to a bottom allotter travel limit for floors 1 to 5 including ANDs 51 to 55 respectively common to all cars. They are also applied to a bottom car travel limit circuit for each car, typified for one car by ANDs 56 to 60 for floors 1 to 5. The signal on the leads 46 to 50 signifies that the scanner interrogation floor is above or at the respective floor. Two conditions are considered, the scanning sequence before the first reversal of scan and after the second reversal of scan, and the scanning sequence after the first reversal of scan and before the second reversal of scan hereinafter referred to as "during the first scan reversal." Scan limits are effectively moved in one scan position during the first scan reversal.

Prior to the first scan reversal no signal is applied from the allotter scanner control (not shown) on lead 61 and inverter 62 to lead 63 to enable each of ANDs 64 to 68 for floors 1 to 5. With the allotter scanner at floor three a signal on lead 69 gates AND 66 to OR 43 to issue on lead 48 a "Bottom Distance Fate Is at Three" signal. OR 43 by a branch of lead 48 gates OR 42 for floor two which gates OR 41 by its output lead 47. Thus enabling signals are present on leads 48, 47 and 46 for the bottom allotter travel limit and each car's bottom car travel limit to enable those circuits for the scanner floor and all floors below.

Advance of the scan transfers the gated AND and the corresponding OR for the floor. Thus if the scanner is ascending, its signal for floor four at lead 71 will be imposed and that on lead 69 removed so that AND 66 is inhibited and AND 67 gated. OR 44 will be gated with the output ORs for lower floors. Conversely a descending scan will, upon its advance, inhibit AND 66 to terminate the gating of OR 43 while imposing a gating signal on lead 72 to AND 65 to gate OR 42 and the output ORs for floors below that scan position.

During the first reversal of the allotter scanner in an allotment sequence, a signal is imposed and retained on lead 61 to inhibit all of ANDs 64 to 68. With these ANDs inhibited the scanner location signaled through gated ORs 41 to 45 is lowered one floor. An "Allotter Scanner Is at Three" signal on lead 69 is passed directly to OR 42 by lead 73 to issue a "Bottom Distance Gate Is at Two" signal on lead 47. Thus during the first reversal of scan the scan bottom limit is moved in one floor since the enabling signal is advanced outward one floor from the scan position whereby, if floor three were the limit, the gating signal would be terminated as the scan advanced below four instead of as it advanced below three. After the second reversal of scan, this inhibit to the ANDs of the family 64 to 68 is removed and the limits are returned to their original location.

Bottom distance gate signals are imposed on the bottom travel allotter limit to ascertain the relationship of the scanner position to the allotment floor. The hall call memory of the allotment floor (not shown) passes a signal to the bottom travel allotter limit to enable an appropriate AND of the group 51 to 55. If an "Allotment Floor Is Four" signal is imposed on lead 74 so long as the allotter interrogation floor is at or above the allotment floor prior to the first allotter scanner reversal AND 54 will be gated to issue an "Allotment Floor Is Below the Allotter Scanner Interrogation Floor" on lead 75 to gate OR 76. This signal is used to gate the distance counter for each car of the system as it is passed from OR 76 to lead 77 and FIG. 4. This permits a count of the floors including the allotment floor and the individual car's limit prior to the first reversal of scan and subsequent to the second reversal of scan.

During first reversal of scan a double count of the floor at the allotment limit is avoided by gating the AND of the allotment floor only while the scanner is above that floor. The allotment floor scanner step is thereby gated only once to the distance gating circuits even though the scanner can step to the floor twice, once in the descending and once in the ascending scan directions.

Bottom car travel limits for each car are set by enabling the AND of the group 56 to 60 for the car of the floor defining the limit of car travel as set by the presence of the car, the imposition of a car call for that floor as a command on the car, or the assignment of a hall call for that floor as a demand on the car. These limit signals are developed by an OR gate (not shown) for each floor for the car. The OR is gated from the car's lead position generator (not shown) for that floor, its command memory (not shown) for that floor, or its demand memory (not shown) for that floor. Thus a car at floor three or having a call for floor three will have a signal on lead 78 to enable AND 58 so that it will be gated by the signal on lead 48 when the scanner is at three or above prior to the first scan reversal and when the scanner is at four or above during the first scan reversal. When an AND of the family 56 to 60 is gated, it passes a signal, as on lead 79 from AND 58, to OR 81 lead 82 signifying "This Car Is or Has a Call Below the Allotter Scanner Interrogation Floor." The signal on lead 82 is available as an alternative to that on lead 77 to enable the scanner clock pulse gating to the car's distance counter of FIG. 4 to set the lower limit of the scan position which will be counted.

FIG. 3 shows the counterpart of FIG. 2 for setting the upper limits of the scan position to be gated to the counter either as the allotment floor, the car position, or by the calls which the car will be required to serve. Top distance gate signals for all cars are derived for floors 1 to 5 through ORs 91 to 95 and passed to leads 96 to 100 respectively. ANDs 101 to 105 are gated for the allotter scanner interrogation floor prior to the first scan reversal and subsequent to the second scan reversal to gate the OR of the scan position and all ORs for floors above that position. Inverter 106 issues on lead 107 an inhibit to each of ANDs 101 to 105 to move the scan limit in one floor during the first scan reversal of the allotter cycle. Thereafter the allotter scanner position signals are passed to the OR of the next higher floor and to succeeding higher floors.

The allotment floor upper limit for all cars is defined by gating one of ANDs 111 to 115 for floors 1 to 5 by a coincidence of a top distance gate signal at or above the floor of the AND and an allotment floor signal from the call finder as on lead 74 for "Allotment Floor Is Four" to AND 114. When one of the top allotter travel limit ANDs 111 to 115 is gated, it gates OR 116 to issue on lead 117 to FIG. 4 an "Allotment Floor Is Above the Allotter Scanner Interrogation Floor" signal.

The car travel upper limit for each car is typified by the circuit of ANDs 121 to 125 for floors 1 to 5. These ANDs are enabled by the signals from the top distance gating ORs 91 to 95 when the scanner is at or below the car limit. The other leg of the AND gate is made from an OR (not shown) in each car's controls responsive to the presence of the car, the imposition of a car call for that floor as a command on the car, or the assignment of a hall call for that floor as a demand on the car. As for the ANDs 56 to 60, the signal for the third floor as the limit of a car's travel is defined by a signal on lead 78 to AND 123. When any of ANDs 121 to 125 are gated, they gate OR 126 to lead 127 in FIG. 4.

The logic diagram of FIG. 4 gates clock pulses issued on lead 128 during the allotter read interval of each clock cycle of the clock driving the allotter scanner. Gating is through AND 129 to lead 131 and the binary counter 132 while within the limits defined in FIGS. 2 and 3 for the upper and lower allotment floor limits, leads 117 and 77, or the upper and lower car travel limits, leads 127 and 82, and until the car is located to set flip flop 133 and issue an inhibit signal on its reset lead 134. The count is gated for a car only until the car position is coincident with the allotter interrogation floor to issue a signal on lead 135 which immediately imposes an inhibit through inverter 136 to input 137 of AND 129 and thereafter throughout the subsequent steps of the allotter cycle maintains an inhibit on lead 134. When the allotter is reset at the initiation of its next allotment cycle a reset signal is applied on lead 138 to flip flop 133 for each car whereby it is reset to enable AND 129.

AND 129 is gated while the allotter scan is between the limits of car location, call location or allotment call location as defined by the coincident gating of ORs 139 and 141. For the lower limit, OR 139 is gated prior to the first allotter scan reversal and subsequent to the second scan reversal while the allotter scanner is at or above the allotment floor, the car position or the floor of a call imposed on the car, and during the first allotter scan reversal is gated while the allotter scanner is above the allotment floor, the car position or the floor of a call imposed on the car. These factors are indicated by signals on leads 77 and 82. For the upper limit OR 141 is gated prior to the first allotter scan reversal and subsequent to the second scan reversal while the allotter scanner is at or below the allotment floor, the car position or the floor of a call for the car, and during the first allotter scan reversal is gated while the allotter scanner is below the allotment floor, the car position or the floor of a call for the car. These factors are indicated by signals on leads 117 and 127.

When the allotter scanner and the car are located at the same floor a signal is passed from an OR gate (not shown) fed by an AND gate for each floor (not shown) which is gated by a coincidence of the car lead position signal for that floor and the allotter scanner position for that floor. Thus coincidence of these factors at any floor gates the OR to impose a signal on lead 142.

It will be noted that car direction and scan direction are not effective factors at lead 142. However the mode of operation of the scanner in the allotter is to identify a car as found only when its travel direction opposes the scan direction. Thus for an up hall call the allotter scan direction is initially down from that floor since the closest cars will be encountered immediately below the floor. The closest car below the floor is the first up traveling car. Similarly when the scan reaches the limit is reverses so that it scans upward to find descending cars as the next closest. Accordingly, in addition to the coincidence of scan position and car position, a coincidence of scan direction in opposition to car travel direction is required to identify the car as located by the allotter scanner interrogation.

When the allotter scan direction opposes the car direction OR 143 is gated to lead 144. A coincidence of signals on leads 142 and 144 signifies the allotter scanner interrogation floor coincides with the car lead position while the car is set to travel in the direction opposite the scan direction. This gates AND 145 to inhibit the count gating.

OR 143 is gated by AND 146 or AND 147. The car control of the car (not shown) issues a signal for allotter car direction which represents the direction the car is traveling, the direction the car is set to travel, or, in the case of a free car (a car having no calls, which is stopped, and has its doors closed so that it can immediately run to a hall call above or below), both directions of travel. These signals appear as "Allotter Car Direction Is Up" on lead 148 to AND 146 and "Allotter Car Direction Is Down" on lead 149 to AND 147.

A car set for up travel gates AND 146 while the allotter scanner is effectively scanning downward. The allotter scanner control (not shown) while set to scan downward issues a "Scanner Logic Direction Is Down" signal on lead 151 to gate AND 146. The allotter scanner is sequenced by its control such that it represents the direction of scan toward the limits of scan at those limits and transfers its direction of scan with the pulse which advance the scan from the limits. It is most convenient to scan an even number of scan positions. Thus, in the case of a thirteen floor system, the scanner scans through positions one through fourteen and at each position other than at the limits has an up and a down count. Since the reversal of the scanner at position fourteen is outside of the range of interest no provision need be made for sensing an ascending car found as it approaches the fourteenth floor. In the case of the lower limit, at scan position one, a reversal is performed and up scan is established only as the scan position advances to two and thus the allotter interrogation floor is two. A car still set for down travel as it approaches floor one can be missed since it can be a down car while the scanner has a down logic direction at one. To avoid this malfunction the scanner controls are arranged to enable AND 147 while the scan is at one by developing a "Scanner Control Direction Is Up" signal when the allotter scanner is at one even though the "Scanner Logic Direction Is Up" signal is not developed until the allotter scanner is advanced from one to two. These signals are respectively applied to leads 152 and 153 so that OR 154 is gated for the allotter scanner at position one and for an up logic direction of the scanner at all other positions. Thus a free car or a down car gates AND 147 when OR 154 is gated to enable the car is located AND 145.

Upon the completion of the allotter scan all cars in the system have been located and their distance counters 132 set so that they augment the signal on lead 25 by providing additional paths to ground through their analog summing resistances 146. These resistances are of a magnitude to pass current in the relationship for the first through fifth stages of the counter 132 as the values one, two, four, eight and sixteen respectively.

Total current drawn on lead 25 establishes the output voltage level from operational amplifier 155 to lead 30 and comparator 31. The end of the allotter scan starts the allotter ramp generator to issue a signal on lead 33 to each car's comparator. When the actuating relationship is developed between the ramp signal on 33 and a waiting time signal for the car in the most favored condition to serve the call and having the lowest output voltage from amplifier 155 to lead 30, comparator 31 issues a signal on lead 157 to the set input of the car chosen memory flip flop 158. Set flip flop 158 passes a signal on lead 159 which gates AND 161, provided no "Inhibit Allotment to This Car" signal is imposed on lead 162, whereby a "This Car Is Chosen for Allotment" signal is issued at lead 34.

The allotment is thereby based upon the true distance each car must travel to serve its currently imposed requirements. This distance can conveniently be scaled to one second per floor in a system having cars operate at 600 feet per minute over an average ten foot floor height. Time delays for the other factors can similarly be introduced, for example, as a second per passenger sensed by the load measuring means of each car to account for the increased delays incurred in passager transfer as the car becomes more crowded. The system thereby performs the allotment function with a precisely defined basis of service time or service capability to insure the most effective distribution of hall calls to the individual cars.

Since a multiplicity of call allotments are performed, each allotment cycle is arranged to reset the allotment equipment for each car. This is done advantageously at the initiation of the cycle at the time the call finder identifies the allotment call by resetting the counters and memory flip flops with the presetting of the allotter scanner (by means not shown). The allotter reset signal is imposed on lead 138 and applied to each stage of the binary counter 132, to the reset of the car is found flip flop 133, and to the reset of the car chosen memory 158.

In practice the car distance counter 132 receives a true count of the number of floors the car will traverse to the allotment call. Assume an up hall call for the fourth floor is the allotment call. The initial scan direction for an up call will be downward. For each car scanner pulses will be passed on lead 128 while AND 146 is enabled by a signal on lead 151 through the scan of positions four to one, then AND 147 will be enabled through lead 152 for position one and lead 153 for positions two through thirteen, thereafter AND 146 will be enabled by a signal on lead 151 for positions thirteen through four. A car can be located below the fourth floor and set for either up or down travel, at the fourth floor set for down travel or above the fourth floor and set for either up or down travel. The closest such car is one below the fourth floor set for up travel. It is found by gating AND 145 as the scanner scans downward to coincidence with its lead position to impose a signal on lead 142 since its AND 146 is gated. On the ascending scan descending cars have AND 147 gated and gate their AND 145 when the scanner and car are coincident. The return descending scan enables the ascending cars to be found since their ANDs 146 will again be gated and their ANDs 145 are gated when scan and car are coincident.

Prior to the location of the car by gating AND 145 its limits of travel must embrace the scan interrogation floor for that floor to be counted by the distance counter. Both of ORs 141 and 139 must be gated. If the most extreme floor to which the car will travel is the allotment floor the OR 141 will be gated until the signal on lead 117 is terminated for an upper limit and OR 139 will be gated until the signal on lead 77 is terminated for a lower limit. Thus a car below the allotment floor will be gated for at least an upper limit of the allotment floor at lead 117 and OR 141 from FIG. 3 such that as the scan progresses downward from four initially leads 99, 100 and all top distance gate outputs for floors above will be gated and until the scan has reversed and ascended to four AND 114 will be gated to OR 116 and lead 117. Similarly for cars above the allotment floor a minimum lower limit at floor four will be established in FIG. 2 by gating AND 54 to OR 76 and lead 77 while the scan is at floor four prior to the first reversal and at floors five and above subsequent to the first reversal.

A limit by either a car's position, a command for a floor or a demand for a floor issues a gate signal to lead 127 for an upper limit and to lead 82 for a lower limit until the scanner reaches the extreme floor for any of these conditions for the car prior to the first reversal of scan and subsequent to the second reversal of scan and until the scanner reaches the next adjacent and preceding floor to the extreme floor during the first reversal.

In the example of the car at floor ten set for down travel and having a command for floor three, the read pulse of the scanner at the allotment floor and at the third floor will be gated on the initial descending scan at OR 81 by ANDs 67 and 66 to OR 43 and AND 58. At the second floor scan and below OR 43 will be inhibited to inhibit AND 58. As the scan reverses ANDs 64 to 68 are inhibited so that OR 43 is not gated to AND 58 until the scan is at floor four or above. Thus counts are inhibited for two and one on the descending count and for one to three on the ascending count by the absence of a gating signal to OR 139. The count will again be inhibited by the car position at ten when the scanner ascends from position nine since the enabling signal from OR 126 on lead 127 to OR 141 will terminate at this time to define an ascending count for floors four through nine inclusive. At floor ten the car is located signal actuates inverter 136 and flip flop 133 to thereafter maintain the inhibit to the distance counter.

Assume next for the exemplary allotment call an ascending car at floor ten having calls at eleven and at eight. The limits for such a car in answering an up hall call at four are its current position at ten, its ascent to eleven and its descent to the allotment floor at four. The initial down scan counts only the allotment floor through the gating of ORs 76, 116 and 126 at floor four. Below that floor OR 76 is inhibited to inhibit the count. The ascending scan when it reaches floor four ceases to gate OR 116, without effect since OR 126 is gated to OR 141. When the scan reaches floor five, it again gates OR 76 to OR 139 which with gated OR 141 gates the count five through ten to the counter. As the scanner advances from ten to eleven the AND (not shown) in the family 121 to 125 for floor eleven is inhibited to inhibit OR 126 thereby inhibiting OR 141 and the count to the counter. When the scan again reverses the travel limits are extended by removing the signal to inverter 106 thereby enabling the ANDs of the family 101 to 105. As the scan descends to the eleventh floor OR 141 is again gated by OR 126 from the AND for the eleventh floor in the family 121 to 125 to gate another count to counter 132. When the scan descends to ten the car is found to gate AND 145 and impose inhibits from inverter 136 and flip flop 133 on AND 129. Thus the car distance counter 132 accumulates a count of eight from the descending scan at four, the ascending scan of five through ten inclusive and the descending scan of eleven to represent the eight floors to be traversed by the car in running upward from floor ten to floor eleven and downward from floor eleven to floor four.

While the invention has been depicted as a means of establishing the true distance to be traversed by an elevator car wherein the range of travel of the car is less than the range of travel available in the system for the current consideration, it is to be appreciated that the invention can be applied in other utilizations where the gating of the coincidence gate 129 in response to the lower travel limit gate for the car OR 139 which is gated when the scanner interrogation floor is at or above the limits of travel established for the car and an upper travel limit gate for the car the OR 141 which is gated when the scanner interrogation floor is at or below the limits of travel established for the car. In the case where true travel distance is the factor to be ascertained, this means for defining the range of travel of the car gates read pulses corresponding to scanner interrogation floors applied through the lead 128 provided there is in coincidence with the gated upper and lower travel limits no signal indicating that the car has been found as derived from the inverter 136 and the flip flop 133. A signal on a lead 142 to AND 145 constitutes means to identify the floor of the car in response to coincidence of the scanner interrogation with the floor at which the car is located. For scan interrogation purposes in the distance counter, the OR 143 must also be gated as means to identify the service direction for a scan in response to the setting of the direction the car is to travel in opposition to the direction of scan of floors by the scanner. The combination of these factors as sensed in AND 145 constitutes the means to locate the car in response to a coincidence in operation of the floor identifying means and the service direction identifying means.

The lower travel limits for the car are defined in FIG. 2 by the relationship of the floors to which the car will be required to travel to the scanner interrogation floor. In a travel distance ascertaining means for the travel distance between the current floor location of a car and a given floor, the allotment floor constitutes the given floor and is related to the scanner interrogation floor through OR 76. In addition to the allotment floor as a car travel limit, the floor at which the car is positioned and the floors for which the car has commands and demands also constitute limits of car travel, the most proximate of these floors to the terminal landings forming the limit for any given set of conditions. Car position and the location of its calls relative to the allotter scanner interrogation floor is sensed in the OR 81 for the lower travel limit. In like manner, the upper travel limit for a car is ascertained in the elements of FIG. 3 such that when the allotment floor is the upper travel limit, OR 116 constitutes a gate for the given floor which is responsive to the identifying means for the allotment floor, the call finder in the present type of system, when the scanner interrogation floor is at or above that given floor for the car. The upper limit with respect to car position and the calls imposed on the car includes the gate OR 126 which is gated so long as the car position or a call imposed upon the car is at or above the scanner interrogation floor.

When utilized as a distance counter in the combination including counter 132 where a count of the number of floors to be traversed by the car in traveling from its current position serving the calls imposed upon it and stopping at the floor for which travel evaluation is being undertaken, the call finder in identifying the allotment floor constitutes means to issue an identifying signal for a given floor and a given service direction therefrom as the signal on lead 74. The allotter scanner in making a step-by-step interrogation of floors in an ascending and descending sequence is preset by the call finder which also functions as means to initiate the scan of the scanner from the given floor in an initial direction opposed to the given service direction of the allotment call. The first reversal of the scan as signified on lead 61 enables inverter 62 to function as means to define the interval said scanner scans in a second scan direction opposed to said initial direction to thereby during that interval inhibit the travel limit gates when the scanner interrogation floor is at the limits of travel established for the car. In this manner, during the interval of the first reversal those gates are gated only when the scanner interrogation floor is moved inward from the car travel limits one floor position, that is the next floor above the lower limit and the next floor below the upper limit. This technique avoids a double count of the floor to be traversed at the limit of the car's travel.

Inasmuch as the apparatus disclosed herein lends itself to application in systems other than those disclosed in the Hall et al. applications and sub-combinations thereof can be employed for other than travel distance counting where definition of a range of travel is desirable in an elevator system, it is to be appreciated that the preceding description and the drawings are to be read as illustrative and not in a limiting sense.

Having described the invention, we claim:

1. In an elevator system having a car serve a plurality of floors including a lower and an upper terminal floors and a plurality of floors intermediate said terminal floors, means to establish a limit of travel in a given direction for said car which is spaced from said terminal floor for travel in said given direction, means for requesting service at a given floor by said car traveling from said unit in a direction opposite said given direction, means effective while said car is required to travel toward said limit prior to traveling toward said given floor to ascertain the total travel distance for said car between said given floor and said limit and between said limit and the car.

2. A combination according to claim 1 wherein means to ascertain travel distance is a counter for counting the floors to be traversed by said car in traveling to said given floor.

3. A combination according to claim 1 including a second car serving said plurality of floors, means to establish a limit of travel in said given direction for said second car which is spaced from said terminal floor for travelin said given direction, and means to ascertain the travel distance for said second car between said given floor and said second car.

4. A combination according to claim 1 including means to register calls for service at said floors requiring travel of said car to the floor of an operated call registering means in said given direction, said travel limit means being responsive to said operated call registering means to establish a limit at said floor of said call registering means.

5. A combination according to claim 1 including means to establish a second limit of travel in a direction opposite said given direction for said car, said second limit being spaced from said terminal floor for travel in said direction opposite said given direction; said travel distance ascertaining means being effective when said car is set to travel in a direction away from said given floor toward said second limit to ascertain the distance between said car and said second travel limit, the distance between said second travel limit and said first travel limit, and the distance between said first travel limit and said given floor.

6. In an elevator system comprising a car serving a plurality of floors including upon and lower terminal floors and a plurality of floors between said terminal floors, means to indicate the floor at which said car is located; means to indicate a given floor and a given service direction from said floor for which service by said car is to be considered; a scanner for step-by-step interrogation of floors in an ascending and descending scan sequence; means to initiate the scan of said scanner from said given floor in an initial direction opposed to said given service direction; a lower travel limit gate for said car which is gated when said scanner interrogation floor is at or above the limits of travel established for said car; an upper travel limit gate for said car which is gated when said scanner interrogation floor is at or below the limits of travel established for said car; a counter for counting certain floors interrogated by said scanner; and a gate for gating floors which are interrogated by said scanner to said counter for each floor interrogated by said scanner between said given floor and the floor at which said car is located only while both said lower travel limit gate for said car and said upper travel limit gate for said car are gated.

7. A combination according to claim 6 including means to define the interval said scanner interrogates floors in a direction opposed to said initial direction; means responsive to said interval defining means to inhibit said lower travel limit gate when said scanner interrogation floor is at the limits of travel established for said car whereby said gate is gated only when said scanner interrogation floor is above the limits of travel established for said car; and means responsive to said interval defining means to inhibit said upper travel limit gate when said scanner interrogation floor is at the limits of travel established for said car whereby said gate is gated only when said scanner interrogation floor is below the limits of travel established for said car.

8. A combination in accordance with claim 6 wherein said lower travel limit gate includes a gate for said given floor which is responsive to the identifying means for said given floor when said scanner interrogation floor is at or above said given floor; and wherein said upper travel limit gate includes a gate for said given floor which is responsive to the identifying means for said given floor when said scanner interrogation floor is at or below said given floor.

9. A combination in accordance with claim 6 wherein said lower travel limit includes a gate which is gated when said scanner interrogation floor is at or above the floor at which said car is located by said means to identify said floor; and wherein said upper travel limit gate for said car includes a gate which is gated when scanner interrogation floor is at or below the floor at which said car is located as indicated by said means to identify said floor.

10. A combination in accordance with claim 6 including means for each of a plurality of said floors to register hall calls for service from said floors; means for each of a plurality of floors to register car calls from within the car for said floors; means to develop an assignment between registered hall calls and said car; said lower travel limit gate for said car including means which is gated when said scanner interrogation floor is at or above a floor for which said car has an operated call registering means; and said upper travel limit gate for said car including means which is gated when said scanner interrogation floor is at or below a floor for which said car has a call register means operated.

11. In an elevator system comprising a car serving a plurality of floors, means for each floor for registering calls for said car for said floor, a scanner for step-by-step interrogation of floors, a lower travel limit gate for said car which is gated when said scanner interrogation floor is at or above the limits of travel established for said car, an upper travel limit gate for said car which is gated when said scanner interrogation floor is at or below the limits of travel established for said car and means to define the range of travel of said car when gated by a coincidence of a scanner operation, the gating of said lower travel limit and the gating of said upper travel limit.

12. A combination in accordance with claim 11 including means to define travel limits for said car as floors at which said car is located and floors for which call registering means for calls for said car are operated.

13. A combination according to claim 11 including a second car, a lower travel limit gate for said second car which is gated when said scanner interrogation floor is at or above the limits of travel established for said second car, an upper travel limit gate for said second car which is gated when said scanner interrogation floor is at or above the limits of travel established for said second car, and means to define the range of travel of said second car when gated by a coincidence of a scanner operation, the gating of said lower travel limit for said second car and the gating of said upper travel limit for said second car.

14. A combination according to claim 13 wherein said range of travel includes a given floor, including means to identify said given floor, means gated when said scanner interrogation floor is at or above said given floor and for providing one lower travel limit for said lower travel limit gates for said first mentioned and second cars, and means gated when said scanner interrogation floor is at or below said given floor and for providing one upper travel limit for said upper travel limit gates for said first mentioned and second cars.

15. A combination according to claim 13 including means to impose calls for floors on said first mentioned car; means to impose calls for floors on said second car; means gated for said first mentioned car when said scanner interrogation floor is at or above a floor of a call imposed on said car for providing one lower travel limit for said lower travel limit gate for said car; means gated for said second car when said scanner interrogation floor is at or above a floor of a call imposed on said car for providing one lower travel limit for said lower travel limit gate for said car; means gated for said first mentioned car when said scanner interrogation floor is at or below a floor of a call imposed on said car for providing one upper travel limit for said upper travel limit gate for said car; and means gated for said second car when said scanner interrogation floor is at or below a floor of a call imposed on said car for providing one upper travel limit for said upper travel limit gate for said car.

References Cited
UNITED STATES PATENTS 3,146,858    9/1964    Leroux et al. _____ 187—29

THOMAS E. LYNCH, Primary Examiner

PO-1050
(5/69)

UNITED STATES PATENT OFFICE
CERTIFICATE OF CORRECTION

Patent No. 3,507,362                    Dated   April 21, 1970

Inventor(s)  James H. Kuzara, Orval J. Martin & Gerald D. Robaszkiewicz

It is certified that error appears in the above-identified patent and that said Letters Patent are hereby corrected as shown below:

Column 2, line 30, "gace" should be -- gave --.

Column 12, line 22, "unit" should be -- limit --;

line 36, "travelin" should be -- travel in --;

line 59, "upon" should be -- upper --.

Signed and sealed this 13th day of August 1974.

(SEAL)
Attest:

McCOY M. GIBSON, JR.
Attesting Officer

C. MARSHALL DANN
Commissioner of Patents